United States Patent
Min

(10) Patent No.: US 12,213,016 B2
(45) Date of Patent: Jan. 28, 2025

(54) TERMINAL

(71) Applicant: NTT DOCOMO, INC., Tokyo (JP)

(72) Inventor: Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/754,879

(22) PCT Filed: Oct. 9, 2020

(86) PCT No.: PCT/JP2020/038328
§ 371 (c)(1),
(2) Date: Apr. 14, 2022

(87) PCT Pub. No.: WO2021/075378
PCT Pub. Date: Apr. 22, 2021

(65) Prior Publication Data
US 2024/0098610 A1    Mar. 21, 2024

(30) Foreign Application Priority Data

Oct. 16, 2019  (JP) .................................. 2019-189340

(51) Int. Cl.
*H04W 36/30* (2009.01)
*H04W 36/36* (2009.01)

(52) U.S. Cl.
CPC ......... *H04W 36/30* (2013.01); *H04W 36/362* (2023.05)

(58) Field of Classification Search
CPC . H04W 74/0833; H04W 36/30; H04W 36/08; H04W 36/302; H04W 36/249; H04W 74/006; H04W 36/0005; H04W 36/00837; H04W 36/362; H04W 36/0094; H04W 36/0079; H04W 36/0058;
(Continued)

(56) References Cited

U.S. PATENT DOCUMENTS

| 8,953,554 B2 * | 2/2015 | Kazmi ................. H04W 36/24 455/436 |
| 9,585,068 B2 * | 2/2017 | Tabet ................ H04W 36/0085 |

(Continued)

FOREIGN PATENT DOCUMENTS

| CN | 110326327 A | 10/2019 |
| WO | 2019175463 A1 | 9/2019 |

OTHER PUBLICATIONS

3GPP TSG RAN Meeting #83; RP-190489 "New WID: NR mobility enhancements" Intel Corporation; Shenzhen, China; Mar. 18-21, 2019 (5 pages).
(Continued)

*Primary Examiner* — Olumide Ajibade Akonai
(74) *Attorney, Agent, or Firm* — Osha Bergman Watanabe & Burton LLP

(57) ABSTRACT

A terminal includes a receiving unit that receives configuration information of a transition destination cell from a gNB by a conditional cell transition in the gNB in which the terminal resides, and a control unit that performs a transition to the transition destination cell based on the configuration information of the transition destination cell, without receiving a transition command. In a case where the receiving unit receives the configuration information of the transition destination cell, the control unit starts a CHO timer and can perform the conditional cell transition before the CHO timer expires.

3 Claims, 8 Drawing Sheets

(58) Field of Classification Search
CPC ............. H04W 36/0085; H04W 36/36; H04W 36/185; H04W 36/00; H04W 24/02; H04W 36/037; H04W 48/20
See application file for complete search history.

(56) References Cited

U.S. PATENT DOCUMENTS

| | | | |
|---|---|---|---|
| 11,736,996 B2* | 8/2023 | Gu ................... | H04W 36/00837 370/331 |
| 11,997,550 B2* | 5/2024 | Kim ................... | H04W 36/0079 |
| 2013/0045741 A1* | 2/2013 | Martin ................ | H04W 36/20 455/436 |
| 2016/0174124 A1* | 6/2016 | Basu Mallick ... | H04W 36/0005 370/331 |
| 2018/0227805 A1* | 8/2018 | Jang ................... | H04W 72/1268 |
| 2019/0246323 A1 | 8/2019 | Kim et al. | |
| 2019/0387440 A1 | 12/2019 | Yiu et al. | |
| 2020/0053600 A1* | 2/2020 | Jang ................... | H04W 72/569 |
| 2020/0314711 A1* | 10/2020 | Basu Mallick ..... | H04W 36/305 |
| 2023/0090971 A1 | 3/2023 | Yiu et al. | |

OTHER PUBLICATIONS

3GPP TSG-RAN WG2 Meeting #106; R2-1907669 "Considerations on timer based deconfiguration solution" Huawei, HiSilicon; Reno, Nevada, USA; May 13-17, 2019 (6 pages).

International Search Report issued in International Application No. PCT/JP2020/038328, mailed Dec. 1, 2020 (5 pages).

Written Opinion issued in International Application No. PCT/JP2020/038328; Dated Dec. 1, 2020 (4 pages).

Office Action in the counterpart Chinese application No. 202080071472.X, mailed Mar. 1, 2024 (14 pages).

Office Action in the counterpart Japanese Application No. 2021-552370, mailed May 23, 2023 (7 pages).

Office Action issued in Russian Application No. 2022110741/07; Dated Dec. 15, 2023 (11 pages).

Office Action in the counterpart Japanese Application No. 2021-552370, mailed Aug. 29, 2023 (9 pages).

Office Action in the counterpart Chinese Application No. 202080071472.X, mailed Sep. 7, 2023 (16 pages).

* cited by examiner

TERMINAL

TECHNICAL FIELD

The present invention relates to a terminal that performs radio communication, particularly, a terminal that performs a cell transition without waiting for a transition command.

BACKGROUND ART

The 3rd Generation Partnership Project (3GPP) specifies Long Term Evolution (LTE) and specifies LTE-Advanced (hereinafter, collectively referred to as LTE) for the purpose of further speeding up LTE. In addition, in the 3GPP, specification of a succession system of LTE, called 5G or New Radio (NR), has been studied.

In a conventional handover (HO) procedure, a network determines a target radio base station (also referred to as target cell) based on quality information such as a measurement report transmitted from a terminal, and after preparation for a handover, a handover command (transition command) is transmitted to the terminal.

Upon reception of the handover command, the terminal starts a handover timer and completes the HO procedure before the handover timer expires.

However, when the terminal passes an appropriate handover point during the preparation for a handover on the network, it transitions to the target radio base station without receiving the handover command from a source radio base station (also referred to as source cell). For this reason, there is a problem that an instantaneous interruption of a radio link may occur.

Therefore, in order to solve such a problem, a procedure called Conditional HO (conditional cell transition) has been studied (Non Patent Document 1). In the Conditional HO, the network notifies the terminal of configuration information on a candidate cell including a candidate cell for a Conditional HO destination and a transition condition to the candidate cell.

When the transition condition to the candidate cell is satisfied, the terminal transitions to the target radio base station that has configured the transition condition to the candidate cell, without waiting for the handover command from the source radio base station. As a result, the instantaneous interruption of a radio link can be avoided.

PRIOR ART DOCUMENT

Non-Patent Document

Non Patent Document 1: "New WID: NR mobility enhancements", RP-190489, 3GPP TSG RAN Meeting #83, 3GPP, March 2019

SUMMARY OF THE INVENTION

However, in the Conditional HO, since the terminal does not receive the handover command, the handover timer is not started.

In the conventional HO procedure, when the handover timer expires because the HO procedure is not completed due to a radio link failure or the like, the terminal stops transitioning to the target radio base station. However, in the Conditional HO procedure, since the handover timer is not started, there is a possibility that the terminal continues to try a transition to the target radio base station even when a radio link failure or the like occurs between the terminal and the target radio base station. In this case, the cell transition by the terminal may be delayed, which is not desirable.

The present invention has been made in view of such a situation, and an object of the present invention is to provide a terminal capable of avoiding a delay of a cell transition even when executing a transition to a transition destination cell without receiving a transition command, based on configuration information on the transition destination cell.

According to one aspect of the present invention, a terminal (terminal 200) including a receiving unit (receiving unit 220) that receives configuration information of a transition destination cell (for example, gNB 100B) from a transition source cell (for example, gNB 100A) by a conditional cell transition in the transition source cell in which the terminal resides; and a control unit (control unit 250) that performs a transition to the transition destination cell based on the configuration information of the transition destination cell, without receiving a transition command, wherein in a case where the receiving unit receives the configuration information of the transition destination cell, the control unit starts a timer (for example, CHO timer 240) and can perform the conditional cell transition before the timer expires.

According to the present invention, the terminal can avoid a delay of a cell transition even when executing a transition to a transition destination cell without receiving a transition command, based on configuration information of the transition destination cell.

BRIEF DESCRIPTION OF DRAWINGS

FIG. 6 is an overall schematic configuration diagram of a radio communication system 10a.

MODES FOR CARRYING OUT THE INVENTION

Figure 1:
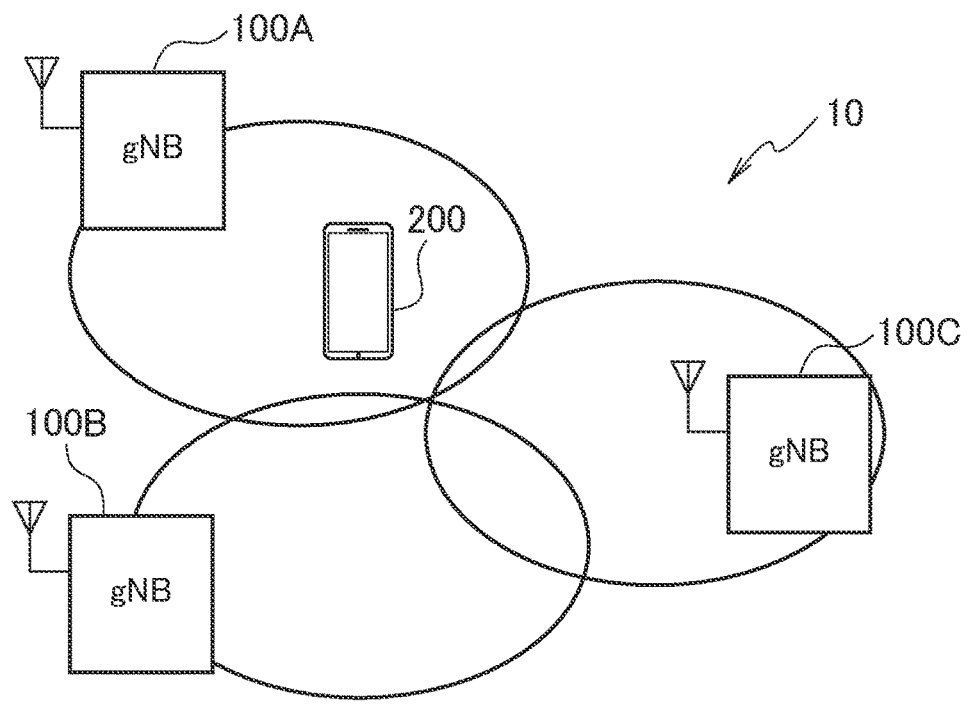
FIG. 1 is an overall schematic configuration diagram of a radio communication system 10.

Hereinafter, embodiments will be described with reference to the drawings. Note that the same functions or configurations are denoted by the same or similar reference numerals, and a description thereof will be omitted as appropriate.

(1) Overall Schematic Configuration of Radio Communication System

FIG. 1 is an overall schematic configuration diagram of a radio communication system 10 according to the present embodiment. The radio communication system 10 is a radio communication system according to New Radio (NR), and includes a Next Generation-Radio Access Network (NG- RAN, not illustrated) and a terminal 200. Note that the terminal is also called User Equipment (UE).

The NG-RAN includes radio base stations 100A, 100B, and 100C (hereinafter, referred to as gNBs 100A, 100B, and 100C). Note that a specific configuration of the radio communication system 10 including the number of gNBs and the number of UEs is not limited to the example illustrated in FIG. 1.

The NG-RAN actually includes a plurality of NG-RAN Nodes, specifically, gNBs (or ng-eNBs), and is connected to a core network (5GC, not illustrated) according to the NR. Note that the NG-RAN and the 5GC may be simply expressed as a network.

Each of the gNBs 100A, 100B, and 100C is a radio base station according to the NR, and performs radio communication with the terminal 200 according to the NR. Each of the gNBs 100A, 100B, and 100C and the terminal 200 can support Massive MIMO in which a more highly directional beam is generated by controlling a radio signal transmitted from a plurality of antenna elements, Carrier Aggregation (CA) in which a plurality of component carriers (CC) are bundled to be used, Dual Connectivity (DC) for simultaneously performing communication between a plurality of NG-RAN Nodes and a terminal, and the like. Note that the CC is also called a carrier.

Each of the gNBs 100A, 100B, and 100C forms one or more cells. The terminal 200 can transition between cells (may be called radio base stations) formed by the gNBs 100A, 100B, and 100C. Note that the expression "transition between cells formed by the gNBs 100A, 100B, and 100C" can be restated as "transition between the gNBs 100A, 100B, and 100C" or "transition between the radio base stations 100A, 100B, and 100C".

The "transition" typically means a handover between cells, or a handover between gNBs, and can include a behavior of the terminal 200 which causes a change of a connection destination cell or a connection destination gNB, such as cell reselection.

A cell (radio base station) of a transition destination to which the terminal 200 transitions is called a target cell or a target radio base station. Further, a cell (radio base station) of a transition source is called a source cell or a source radio base station.

In the radio communication system 10, the terminal 200 can perform a handover (cell transition) according to a conditional handover (hereinafter, Conditional HO), without waiting for a handover command (transition command). Note that the Conditional HO can be abbreviated as CHO.

Note that the radio communication system 10 may include an Evolved Universal Terrestrial Radio Access Network (E-UTRAN) instead of the NG-RAN. In this case, the E-UTRAN includes a plurality of E-UTRAN nodes, specifically, eNBs (or en-gNBs), and is connected to a core network (EPC) according to LTE.

(2) Functional Block Configuration of Radio Communication System

Next, a functional block configuration of the radio communication system 10 will be described. Specifically, a functional block configuration of the terminal 200 will be described. Hereinafter, only portions related to the features of the present embodiment will be described. Therefore, the terminal 200 also includes other functional blocks that are not directly related to the features of the present embodiment.

Figure 2:
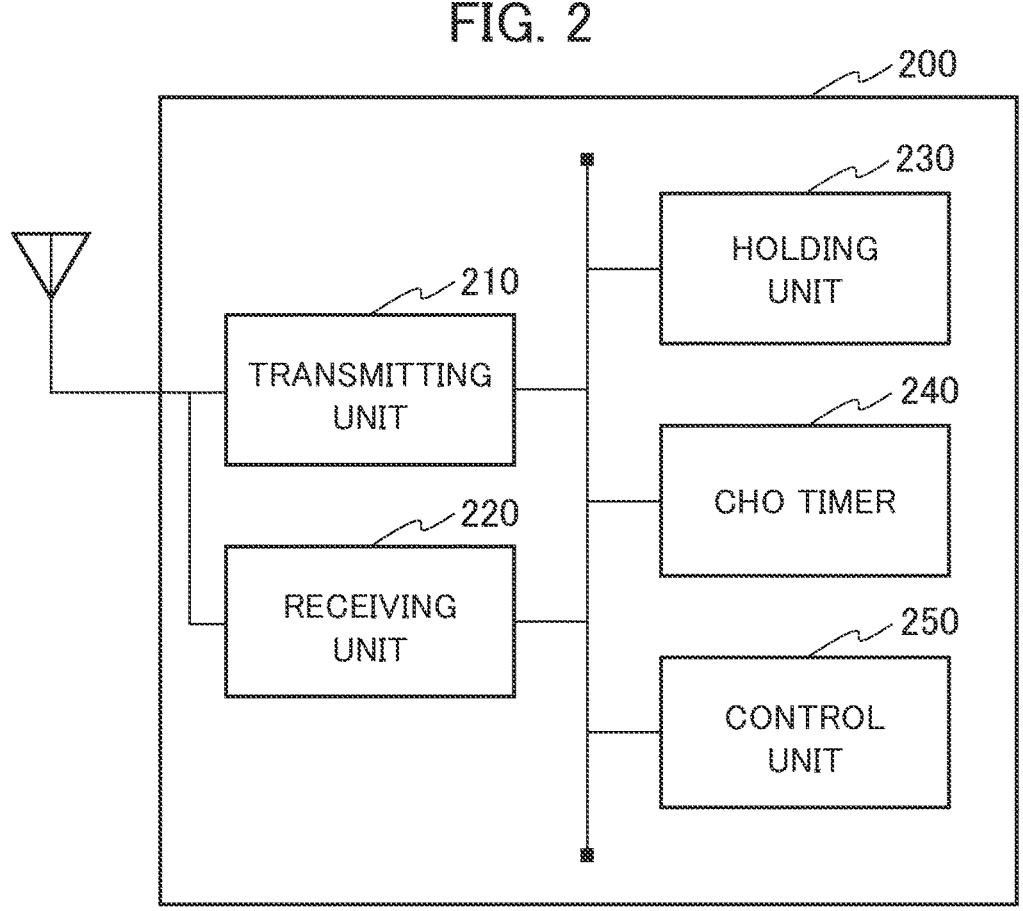
FIG. 2 is a functional block configuration diagram of a terminal 200.

FIG. 2 is a functional block configuration diagram of the terminal 200. As illustrated in FIG. 2, the terminal 200 includes a transmitting unit 210, a receiving unit 220, a holding unit 230, a CHO timer 240, and a control unit 250.

The transmitting unit 210 transmits an uplink signal (UL signal) according to the NR. The receiving unit 220 receives a downlink signal (DL signal) according to the NR. Specifically, the transmitting unit 210 and the receiving unit 220 perform radio communication with each of the gNBs 100A to 100C via a control channel or a data channel.

The transmitting unit 210 transmits a radio resource control (RRC) message. The transmitting unit 210 transmits, for example, an RRC reconfiguration complete message (RRC Reconfiguration Complete).

The receiving unit 220 receives the RRC message. The receiving unit 220 receives, for example, an RRC reconfiguration message (RRC Reconfiguration).

In a cell (for example, gNB 100A) where the terminal 200 resides, the receiving unit 220 receives configuration information of a transition destination cell (candidate cell, for example, gNB 100B and gNB 100C) from the cell by the Conditional HO. Note that the cell where the terminal 200 resides is also called a transition source cell.

The holding unit 230 holds the configuration information of the transition destination cell (candidate cell).

The CHO timer 240 measures a time that the Conditional HO procedure can be performed.

The control unit 250 controls each functional block included in the terminal 200.

The control unit 250 decodes the configuration information of the transition destination cell (candidate cell) included in RRC Reconfiguration when the receiving unit 220 receives RRC Reconfiguration. When the control unit 250 succeeds in decoding of the configuration information of the transition destination cell (candidate cell), the control unit 250 causes the holding unit 230 to hold the configuration information.

The control unit 250 performs a transition to the transition destination cell (candidate cell) without receiving a transition command, based on the configuration information of the transition destination cell (candidate cell) by the Conditional HO held by the holding unit 230.

Specifically, the control unit 250 monitors a condition for transition to the transition destination cell (candidate cell), based on the configuration information of the transition destination cell (candidate cell) held by the holding unit 230. Note that the expression "monitoring a condition for transition to the transition destination cell" can be restated as "evaluating a condition for transition to the transition destination cell".

The control unit 250 performs a random access (RA) procedure between the terminal 200 and the transition destination cell (candidate cell) to transition to the transition destination cell (candidate cell) when the condition for transition to the transition destination cell (candidate cell) is satisfied.

The control unit 250 starts the CHO timer 240 when the receiving unit 220 receives RRC Reconfiguration.

Specifically, the control unit 250 starts the CHO timer 240 at a timing when the receiving unit 220 receives RRC Reconfiguration.

Note that the control unit 250 can start the CHO timer 240 at a timing when the control unit 250 succeeds in decoding of the configuration information of the transition destination cell included in RRCReconfigurationList.

The control unit 250 can start the CHO timer 240 at a timing when the control unit 250 starts to monitor the condition for transition to the transition destination cell (candidate cell).

The control unit 250 can start the CHO timer 240 at a timing when the condition for transition to the transition destination cell (candidate cell) is satisfied.

The control unit 250 stops the CHO timer 240 when the control unit 250 succeeds in the RA procedure.

The control unit 250 determines whether or not the CHO timer 240 expires when the condition for transition to the transition destination cell (candidate cell) is not satisfied or when the control unit 250 fails in the RA procedure. If the CHO timer 240 expires, the control unit 250 detects that a transition to the transition destination cell (candidate cell) fails and then reselects a cell other than the CHO cell, for example.

Thus, in a case where the receiving unit 220 receives RRC Reconfiguration, the control unit 250 starts the CHO timer 240 and can perform the Conditional HO procedure before the CHO timer 240 expires.

(3) Operations of Radio Communication System

Next, operations of the radio communication system 10 will be described. Specifically, the Conditional HO procedure will be described.

(3.1) Conditional HO Procedure

Figure 3:
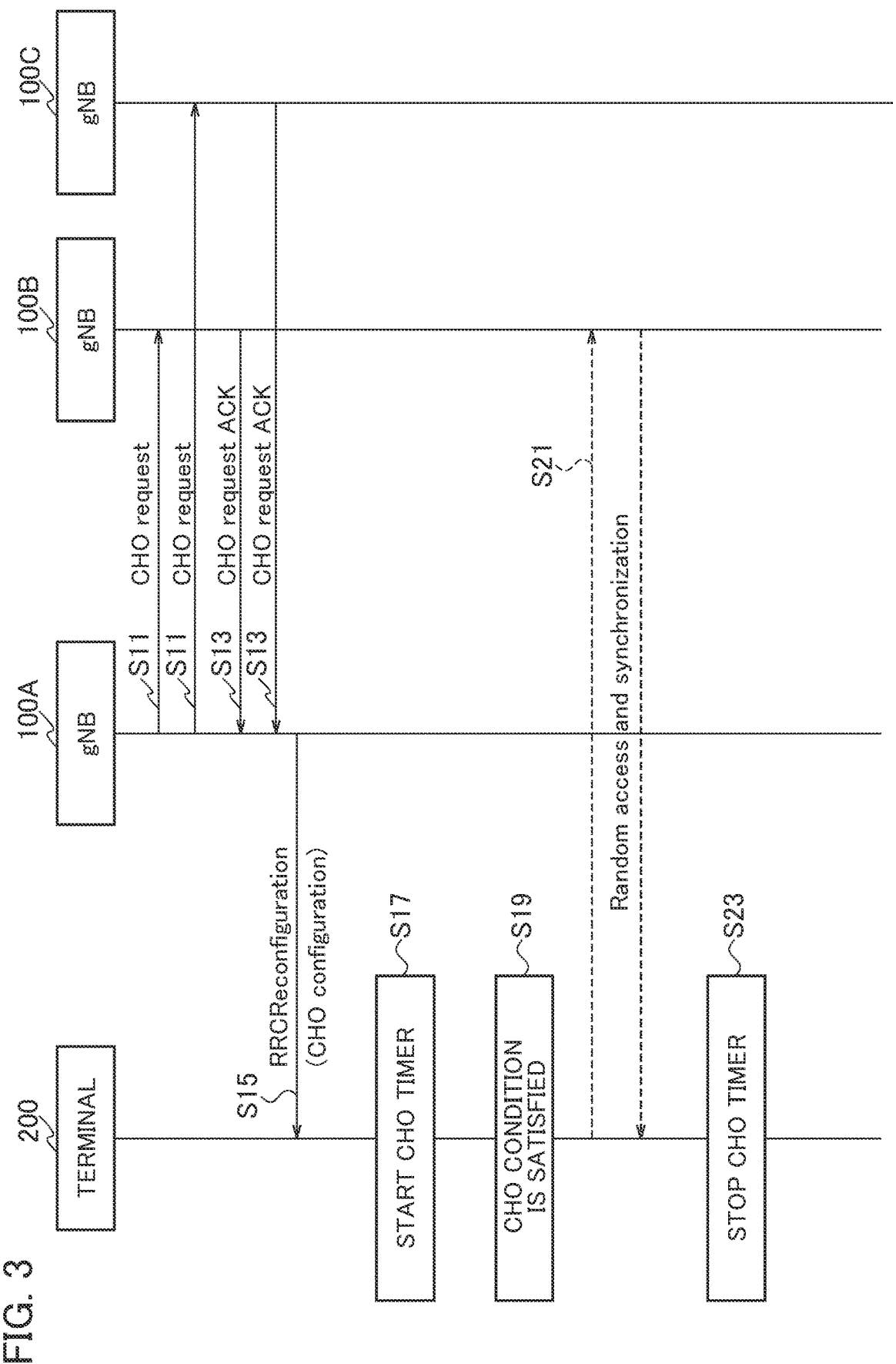
FIG. 3 is a diagram illustrating a sequence of a Conditional HO procedure.

FIG. 3 is a diagram illustrating a sequence of the Conditional HO procedure. As illustrated in FIG. 3, when the gNB 100A (source cell) finds the gNBs 100B and 100C based on a measurement report received from the terminal 200, the gNB 100A transmits a Conditional HO request (CHO request) to the gNBs 100B and 100C (S11). The gNBs 100B and 100c are candidate cells each of which is a candidate for the transition destination cell by the Conditional HO. Note that the number of candidate cells is not limited to two, and may be one or three or more.

When the gNB 100B (candidate cell) receives the CHO request from the gNB 100A, the gNB 100B transmits to the gNB 100A, a CHO request response (CHO request ACK) which is a positive acknowledgement to the CHO request (S13). The CHO request ACK includes configuration information of the candidate cell. The configuration information includes information on the candidate cell and a transition condition to the candidate cell.

Similarly, when the gNB 100C (candidate cell) receives the CHO request from the gNB 100A, the gNB 100C transmits to the gNB 100A, a CHO request response (CHO request ACK) which is a positive acknowledge to the CHO request (S13). The CHO request ACK includes configuration information of the candidate cell. The configuration information includes information on the candidate cell and a transition condition to the candidate cell.

Through this process, the gNBs 100B and 100C are set as candidate cells for the Conditional HO destination of the terminal 200.

When the gNB 100A receives the CHO request ACKs from the gNBs 100B and 100C, the gNB 100A transmits RRC Reconfiguration to the terminal 200 after the set of candidate cells is completed (S15). RRC Reconfiguration includes the configuration information of the candidate cell transmitted from each of the gNBs 100B and 100C. Note that the reception of RRC Reconfiguration is also called reception of a CHO command.

Figure 4:
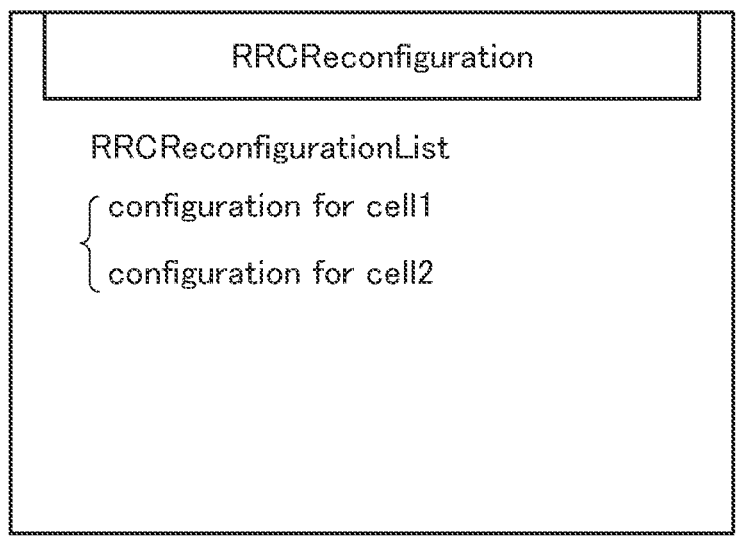
FIG. 4 is a diagram illustrating a configuration of RRC Reconfiguration in the Conditional HO procedure.

FIG. 4 is a diagram illustrating a configuration of RRC Reconfiguration in the Conditional HO procedure.

As illustrated in FIG. 4, a RRC reconfiguration list (RRCReconfigurationList) is set as an information element in RRC Reconfiguration. A configuration for cell 1 and a configuration for cell 2 are set in RRCReconfigurationList. Note that the number of configuration for cell is not limited to two.

In this configuration, when the gNB100A receives the configuration information of the candidate cell from the gNB 100B, the gNB 100A includes the configuration information in the configuration for cell 1 within RRCReconfigurationList. Similarly, when the gNB100A receives the configuration information of the candidate cell from the gNB 100O, the gNB 100A includes the configuration information in the configuration for cell 2 within RRCReconfigurationList.

Note that RRCReconfigurationLit is also called CHO configuration.

When the gNB100A transmits RRC Reconfiguration to the terminal 200, the gNB 100A at least encodes the configuration information of each candidate cell. Note that the gNB 100A can encode the whole of RRC Reconfiguration or RRCReconfigurationList.

Returning to FIG. 3, when the terminal 200 receives RRC Reconfiguration from the gNB 100A, the terminal 200 starts the CHO timer 240 at a proper timing (S17).

When the terminal 200 receives RRC Reconfiguration from the gNB 100A, the terminal 200 also decodes the configuration information of each candidate cell in RRC Reconfiguration to obtain the configuration information.

When the terminal 200 obtains the configuration information of each candidate cell, the terminal 200 starts to monitor the transition condition (CHO condition) to each candidate cell based on the configuration information of each candidate cell. Specifically, the terminal 200 starts to judge whether or not the transition condition to each candidate cell included in the configuration information of each candidate cell is satisfied.

If the terminal 200 judges that the transition condition to one candidate cell is satisfied due to a movement of the terminal 200 or the like (S19), the terminal 200 determines to start a handover (HO) to the one candidate cell without receiving a handover command from the gNB 100A. The candidate cell as the transition destination to which the transition condition is satisfied, is also called as a CHO cell. In the present embodiment, the CHO cell is the gNB 100B.

When the terminal 200 determines to start the HO to the one candidate cell, the terminal 200 performs a random access (RA) procedure between the gNB 100B and the terminal 200, and establishes synchronization between the gNB 100B and the terminal 200 (S21). Thereby, the terminal 200 is connected to the gNB 100B.

If the terminal 200 succeeds in the RA procedure, the terminal 200 stops the CHO timer 240 (S23). When the terminal 200 stops the CHO timer 240, the terminal 200 transmits RRC Reconfiguration Complete to the gNB 100B, for example.

Note that in S13, the gNB 100A can receive only information on a candidate cell from each of the gNBs 100B and 100C. In this case, the gNB 100A sets a transition condition to the candidate cell. Also, in this case, configuration information of the candidate cell includes the information on the candidate cell and the transition condition to the candidate cell set by the gNB 100A.

(3.2) Operations of Terminal

Next, operations of the terminal 200 in the Conditional HO procedure will be described.

(3.2.1) Operation Example 1

Figure 5:
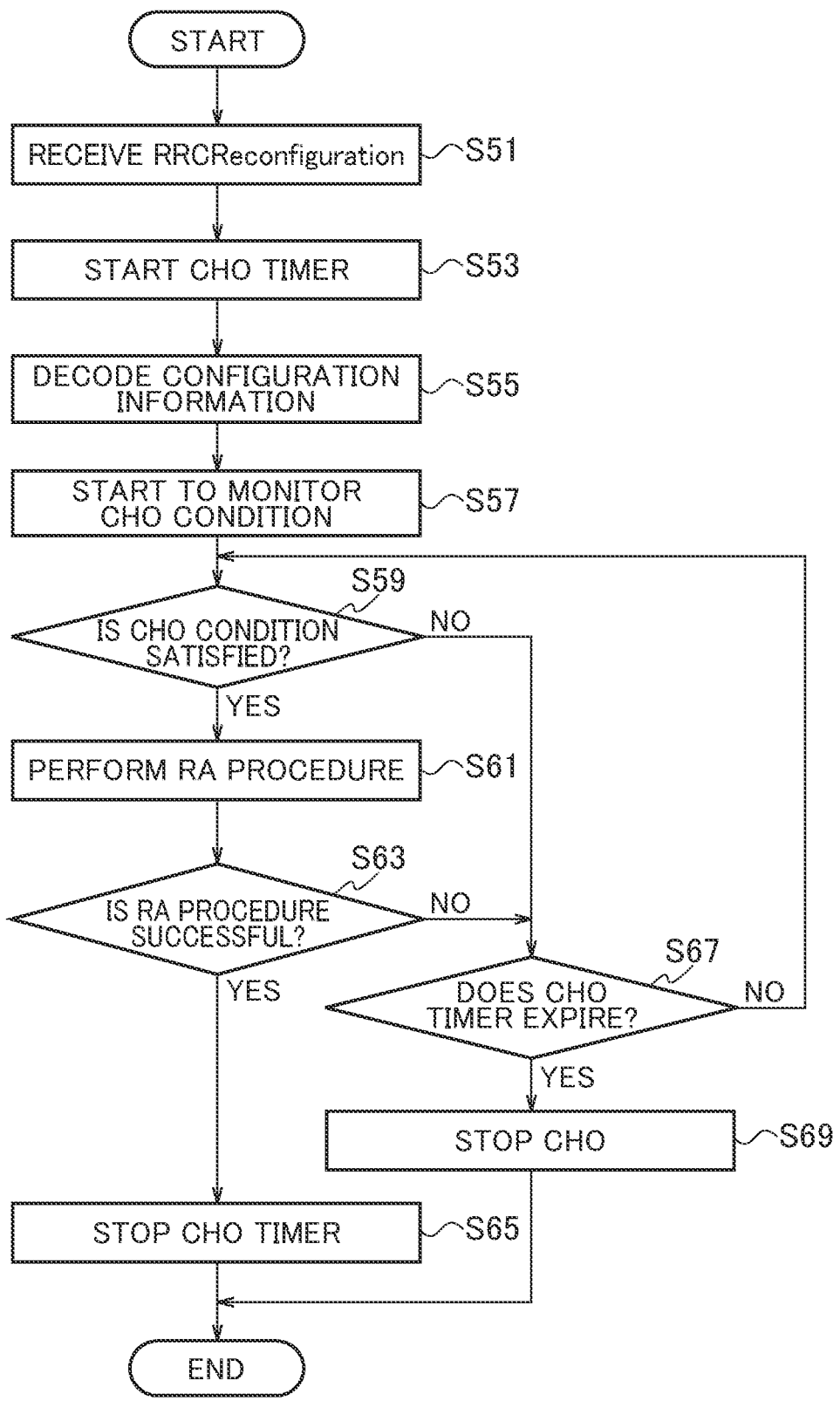
FIG. 5 is a diagram illustrating an operation flow of the terminal 200 in the Conditional HO procedure.

FIG. 5 is a diagram illustrating an operation flow of the terminal 200 in the Conditional HO procedure. As illustrated in FIG. 5, the terminal 200 receives RRC Reconfiguration from the gNB 100A (S51). When the terminal 200 receives RRC Reconfiguration from the gNB 100A, the terminal 200 starts the CHO timer 240 (S53).

When the terminal 200 starts the CHO timer 240, the terminal 200 decodes the configuration information of each candidate cell in RRC Reconfiguration to obtain the configuration information (S55). When the terminal 200 obtains the configuration information of each candidate cell, the terminal 200 starts to monitor the transition condition (CHO condition) to each candidate cell based on the configuration information of each candidate cell (S57). Specifically, the terminal 200 starts to judge whether or not the transition condition to each candidate cell included in the configuration information of each candidate cell is satisfied.

The terminal 200 judges whether or not the transition condition to each candidate cell is satisfied (S59). If the terminal 200 judges that the transition condition to one candidate cell is satisfied, the terminal 200 performs the RA procedure between the gNB 100B and the terminal 200 (S61).

For example, the terminal 200 performs a measurement of each candidate cell. If Event A3 or Event A5 is fulfilled in one candidate cell, the terminal 200 judges that the transition condition to the one candidate cell is satisfied.

Event A3 is an event in which a state where a value of radio quality of a candidate cell is larger than a value obtained by adding an offset to a value of radio quality of a cell where the terminal 200 resides, is measured. Event A5 is an event in which a state where a value of radio quality of a cell where the terminal 200 resides becomes worse than a threshold 1 and a value of radio quality of a candidate cell becomes better than a threshold 2, is measured.

The terminal 200 judges whether or not the RA procedure is successful (S63). If the terminal 200 judges that the RA procedure is successful, the terminal 200 establishes synchronization between the gNB 100B and the terminal 200 and then stops the CHO timer 240 (S65). When the terminal 200 stops the CHO timer 240, the terminal 200 transmits RRC Reconfiguration Complete to the gNB 100B, for example.

If the terminal 200 judges that the transition condition to each candidate cell is not satisfied in S59 or the RA procedure is not successful in S63, the terminal 200 judges whether or not the CHO timer 240 expires (S67). If the terminal 200 judges that the CHO timer 240 expires, the terminal 200 detects that a transition to a candidate cell fails and then stops the Conditional HO procedure (S69). When the terminal 200 stops the Conditional HO procedure, the terminal 200 reselects a cell other than the candidate cell, for example.

On the other hand, if the terminal 200 judges that the CHO timer 240 does not expire, the terminal 200 returns to S59 and then judges whether or not the transition condition to each candidate cell is satisfied

(3.2.2) Operation Example 2

In Operation Example 1, the terminal 200 starts the CHO timer 240 upon reception of RRC Reconfiguration from the gNB 100A. In the present operation example, the terminal 200 starts the CHO timer 240 upon success of decoding of configuration information of a candidate cell in RRC Reconfiguration.

Specifically, when the terminal 200 receives RRC Reconfiguration from the gNB 100A, the terminal 200 decodes configuration information of a candidate cell in RRC Reconfiguration. If the terminal 200 succeeds in decoding of the configuration information of the candidate cell in RRC Reconfiguration, the terminal 200 starts the CHO timer 240.

(3.2.3) Operation Example 3

In Operation Example 1, the terminal 200 starts the CHO timer 240 upon reception of RRC Reconfiguration from the gNB 100A. In the present operation example, the terminal 200 starts the CHO timer 240 upon starting to monitor a CHO condition based on configuration information of a candidate cell.

Specifically, when the terminal 200 receives RRC Reconfiguration from the gNB 100A, the terminal 200 decodes configuration information of a candidate cell in RRC Reconfiguration.

If the terminal 200 succeeds in decoding of the configuration information of the candidate cell in RRC Reconfiguration to obtain the configuration information of the candidate cell, the terminal 200 starts to monitor a CHO condition based on the configuration information. The terminal 200 starts the CHO timer 240 when starting to monitor the CHO condition.

(3.2.4) Operation Example 4

In Operation Example 1, the terminal 200 starts the CHO timer 240 upon reception of RRC Reconfiguration from the gNB 100A. In the present operation example, the terminal 200 starts the CHO timer 240 upon judging that a transition condition to a candidate cell is satisfied.

Specifically, when the terminal 200 receives RRC Reconfiguration from the gNB 100A, the terminal 200 decodes configuration information of a candidate cell in RRC Reconfiguration.

If the terminal 200 succeeds in decoding of the configuration information of the candidate cell in RRC Reconfiguration to obtain the configuration information of the candidate cell, the terminal 200 starts to monitor a CHO condition based on the configuration information. The terminal 200 starts the CHO timer 240 when judging that the transition condition to the candidate cell is satisfied.

(4) Action and Effect

According to the embodiment described above, in a case where the terminal 200 receives the configuration information of the transition destination cell, the terminal 200 starts the CHO timer 240 and can perform the Conditional HO procedure before the CHO timer 240 expires.

In this configuration, when the CHO timer 240 expires because a transition to the transition destination cell is not completed, the terminal 200 stops the Conditional HO procedure.

This prevents the terminal 200 from continuing to try a transition to the transition destination cell when a radio link failure or the like occurs between the terminal 200 and the transition destination cell.

Therefore, the terminal 200 can avoid a delay of a cell transition even when executing a transition to a transition destination cell without receiving a transition command, based on configuration information of the transition destination cell.

According to the embodiment described above, the terminal 200 starts the CHO timer 240 at a timing when the terminal 200 succeeds in decoding of the configuration information of the transition destination cell.

This configuration prevents a situation where the terminal 200 starts the CHO timer 240 even when a transition to the transition destination cell is not performed due to failure of the decoding of the configuration information of the transition destination cell. Therefore, a load of the terminal 200 can be reduced.

According to the embodiment described above, the terminal 200 starts the CHO timer 240 at a timing when the terminal starts to monitor a condition for transition to the transition destination cell or a condition for transition to the transition destination cell is satisfied.

With this configuration, it is possible to set a longer time for the terminal 200 to transition to the transition destination cell while avoiding a decrease in network throughput. Therefore, even if a temporary failure occurs in a radio link between the terminal 200 and the transition destination cell, the terminal 200 can transition to the transition destination cell.

(5) Modified Example

The embodiment described above can be applied to a Conditional SCG Change (CSC). Note that the CSC is also called a Conditional PSCell change or a Conditional PSCell addition.

Figure 6:
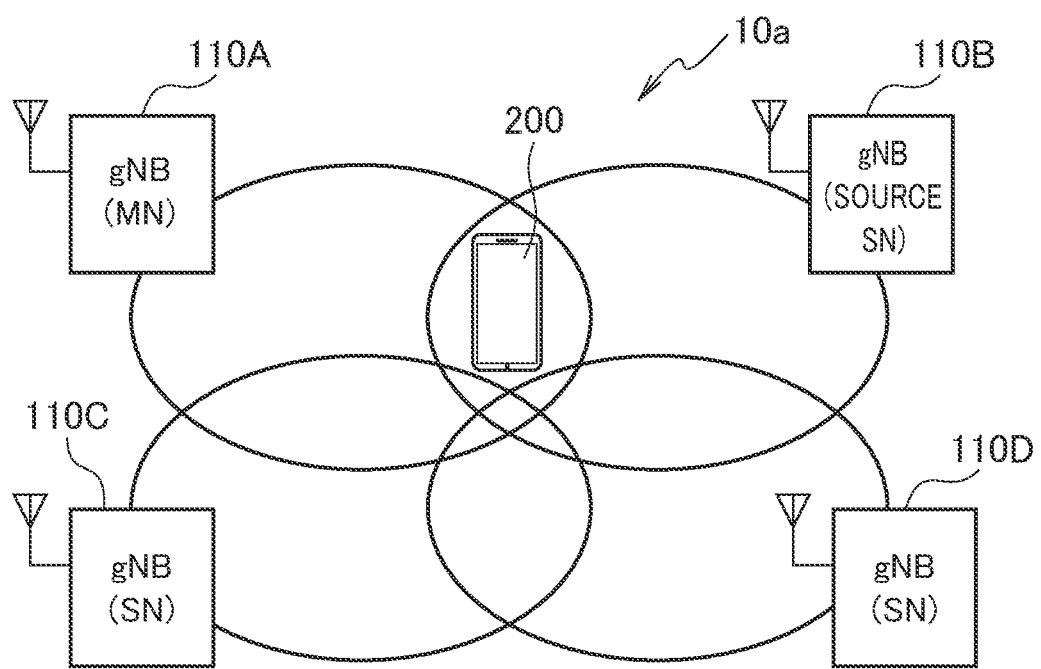

FIG. 6 is an overall schematic configuration diagram of a radio communication system 10a. As illustrated in FIG. 6, the NG-RAN (not illustrated) includes radio base stations 110A, 110B, 110C, and 110D (hereinafter, referred to as gNBs 110A, 110B, 110C, and 110D). Note that a specific configuration of the radio communication system 10a including the number of gNBs and the number of terminals is not limited to the example illustrated in FIG. 6.

The terminal 200 includes a CSC timer that measures a time that the Conditional SCG Change procedure can be performed, instead of the CHO timer 240.

In NR, cells are classified as follows.

A group of a cell associated with a gNB (which is also called a master node (MN)) that provides a control plane connected to a core network, is called a Master Cell Group (MCG). The MCG includes a primary cell (hereinafter, referred to as PCell) and one or more secondary cells (hereinafter, referred to as SCells). The PCell is a cell in which a terminal starts to perform an initial connection with the MN. Note that the MCG can include only the PCell.

A group of a cell associated with a gNB (which is also called a secondary node (SN)) that provides additional resources to a terminal, without providing the control plane connected to the core network, is called a Secondary Cell Group (SCG). The SCG includes a primary SCell (hereinafter, referred to as PSCell) and one or more SCells. The PSCell is a cell in which a terminal starts to perform an initial connection with the SN. Note that the SCG can include only the PSCell.

Note that the PCell is also called a Special Cell (SpCell) in the MCG. The PSCell is also called the SpCell in the SCG.

In the present embodiment, the gNB 110A is configured as the MN, and the gNBs 110B, 110C and 110D are configured as the SNs. In this case, the terminal 200 is connected to the gNB 110A (MN) and one of the gNBs 110B, 110C and 110D (SNs) and performs DC.

In DC, under a state where the terminal 200 is connected to the gNB 110A (MN), the terminal 200 can transition between cells formed by the gNBs 110B, 110C, and 110D (SNs). Note that the expression "transition between cells formed by the gNBs 110B, 110C, and 110D (SNs)" can be restated as "transition between the PSCells formed by the gNBs 110B, 110C, and 110D (SNs)", "transition between the gNBs 110B, 110C, and 110D (SNs)" or "transition between the radio base stations 110B, 110C, and 110D".

The "transition" typically means a handover between cells, or a handover between gNBs, and can include a behavior of the terminal 200 which causes a change of a connection destination cell (PSCell) or a connection destination gNB (SN), such as SN change.

The cell (radio base station) of the transition destination to which the terminal 200 transitions is called a target cell or a target radio base station. Further, an SN of the transition destination to which the terminal 200 transitions is called a target SN. In the present embodiment, the gNB 110C or the gNB 110D is the target SN.

On the other hand, a cell (radio base station) of a transition source is called a source cell or a source radio base station. An SN of the transition source is called a source SN. In the present embodiment, the gNB 110B is the source SN.

In the radio communication system 10a, the terminal 200 performs the SN change called the Conditional SCG change in DC. Note that the Conditional SCG change can be abbreviated as CSC.

Note that the radio communication system 10a may include an Evolved Universal Terrestrial Radio Access Network (E-UTRAN) instead of the NG-RAN. In this case, the E-UTRAN includes a plurality of E-UTRAN nodes, specifically, eNBs (or en-gNBs), and is connected to a core network (EPC) according to LTE.

(5.1) Conditional SCG Change Procedure

Figure 7:
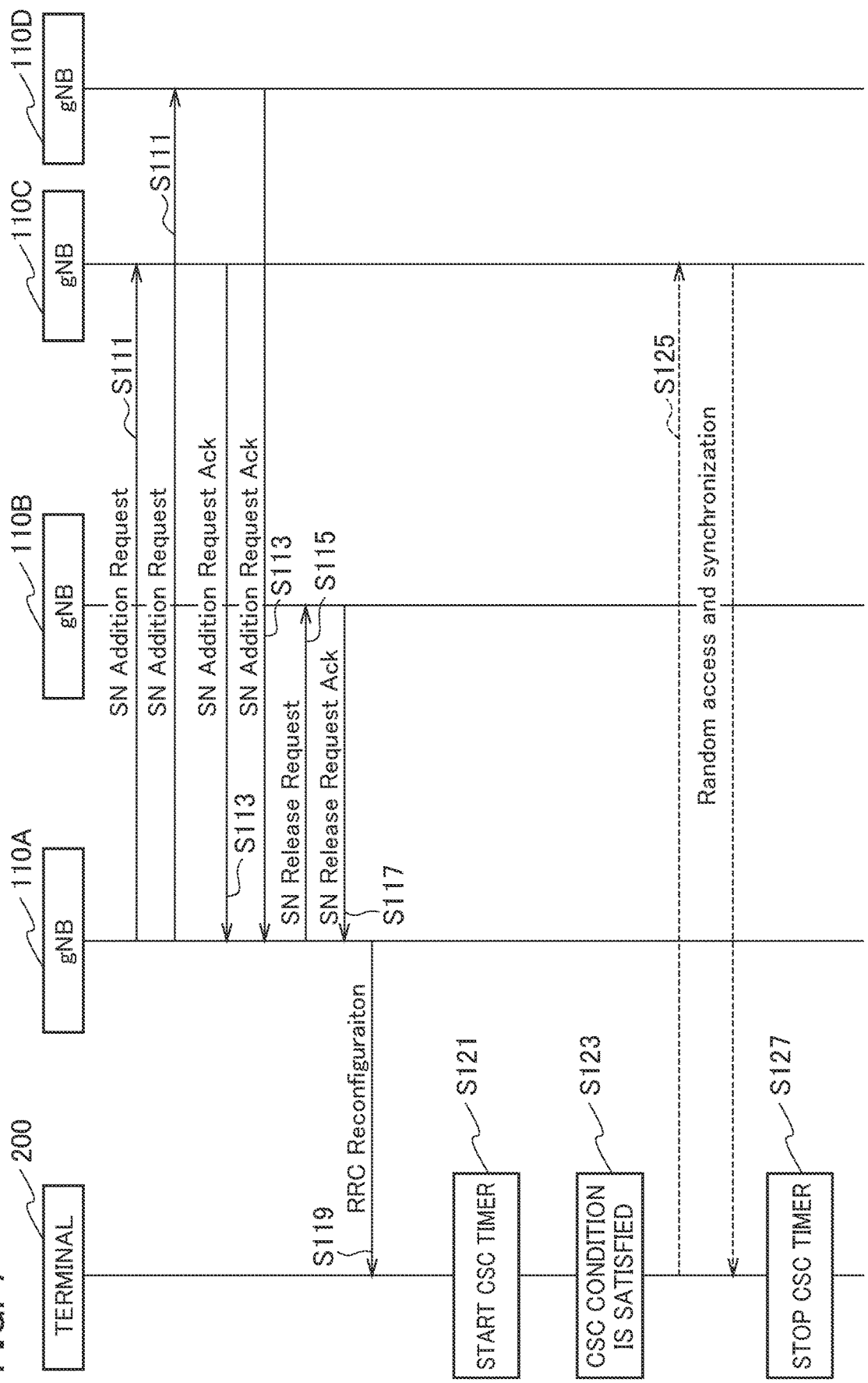
FIG. 7 is a diagram illustrating a sequence of a Conditional SCG Change procedure.

FIG. 7 is a diagram illustrating a sequence of the Conditional SCG Change procedure. As illustrated in FIG. 7, the gNB 110A transmits an SN Addition Request to the gNBs 110C and 110D (candidate cells) other than the gNB 110B (source cell) (S111).

When the gNB 110C (candidate cell) receives the SN Addition Request from the gNB 110A, the gNB 100C transmits to the gNB 110A, an SN Addition Request response (SN Addition Request ACK) which is a positive acknowledgement to the SN Addition Request (S113). The SN Addition Request ACK includes configuration information of the candidate cell. The configuration information includes information on the candidate cell and a transition condition to the candidate cell.

Similarly, when the gNB 110D (candidate cell) receives the SN Addition Request from the gNB 110A, the gNB 110D transmits to the gNB 110A, an SN Addition Request response (SN Addition Request ACK) which is a positive acknowledge to the SN Addition Request (S113). The SN Addition Request ACK includes configuration information of the candidate cell. The configuration information includes information on the candidate cell and a transition condition to the candidate cell.

Through this process, the gNBs 110C and 110D are set as candidate cells for the Conditional SCG Change destination of the terminal 200.

When the gNB 110A receives the SN Addition Request ACKs from the gNBs 110C and 110D, the gNB 110A transmits an SN Release Request to the gNB 110B (source cell) after the set of candidate cells is completed (S115). When the gNB 110B (source cell) receives the SN Release Request, the gNB 100B transmits an SN Release Request ACK to the gNB 110A (MN), stops data transmission to the terminal 200, and releases an SN resource (S117).

When the gNB 110A receives the SN Release Request ACK from the gNB 110B (source cell), the gNB 110A transmits RRC Reconfiguration to the terminal 200 (S119). RRC Reconfiguration includes the configuration information of the candidate cell transmitted from each of the gNBs 110C and 110D. Note that the reception of RRC Reconfiguration is also called reception of a CSC command.

When the gNB110A transmits RRC Reconfiguration to the terminal 200, the gNB 110A at least encodes the configuration information of each candidate cell.

When the terminal 200 receives RRC Reconfiguration from the gNB 110A, the terminal 200 also starts the CSC timer at a proper timing (S121).

When the terminal 200 receives RRC Reconfiguration from the gNB 110A, the terminal 200 decodes the configuration information of each candidate cell in RRC Reconfiguration to obtain the configuration information. When the terminal 200 obtains the configuration information of each candidate cell, the terminal 200 starts to monitor the transition condition (CSC condition) to each candidate cell based on the configuration information. Specifically, the terminal 200 starts to judge whether or not the transition condition to each candidate cell included in the configuration information of each candidate cell is satisfied.

If the terminal 200 judges that the transition condition to one candidate cell is satisfied due to a movement of the terminal 200 or the like (S123), the terminal 200 determines to start an SN change to the one candidate cell without receiving a command from the source gNB 110A. The candidate cell as the transition destination to which the transition condition is satisfied, is also called as a CSC cell. In the present embodiment, the CSC cell is the gNB 110C.

When the terminal 200 determines to start the SN change to the one candidate cell, the terminal 200 performs a random access (RA) procedure between the gNB 110C and the terminal 200, and establishes synchronization between the gNB 110C and the terminal 200 (S125). Thereby, the terminal 200 is connected to the gNB 110C.

If the terminal 200 succeeds in the RA procedure, the terminal 200 stops the CSC timer (S127). When the terminal 200 stops the CSC timer, the terminal 200 transmits RRC Reconfiguration Complete to the gNB 110C, for example.

Note that in S113, the gNB 110A can receive only information on a candidate cell from each of the gNBs 110C and 110D. In this case, the gNB 110A sets a transition condition to the candidate cell. Also, in this case, configuration information of the candidate cell includes the information on the candidate cell and the transition condition to the candidate cell set by the gNB 110A.

(5.2) Operations of Terminal

Next, operations of the terminal 200 in the Conditional SCG Change procedure will be described.

(5.2.1) Operation Example 1

Figure 8:
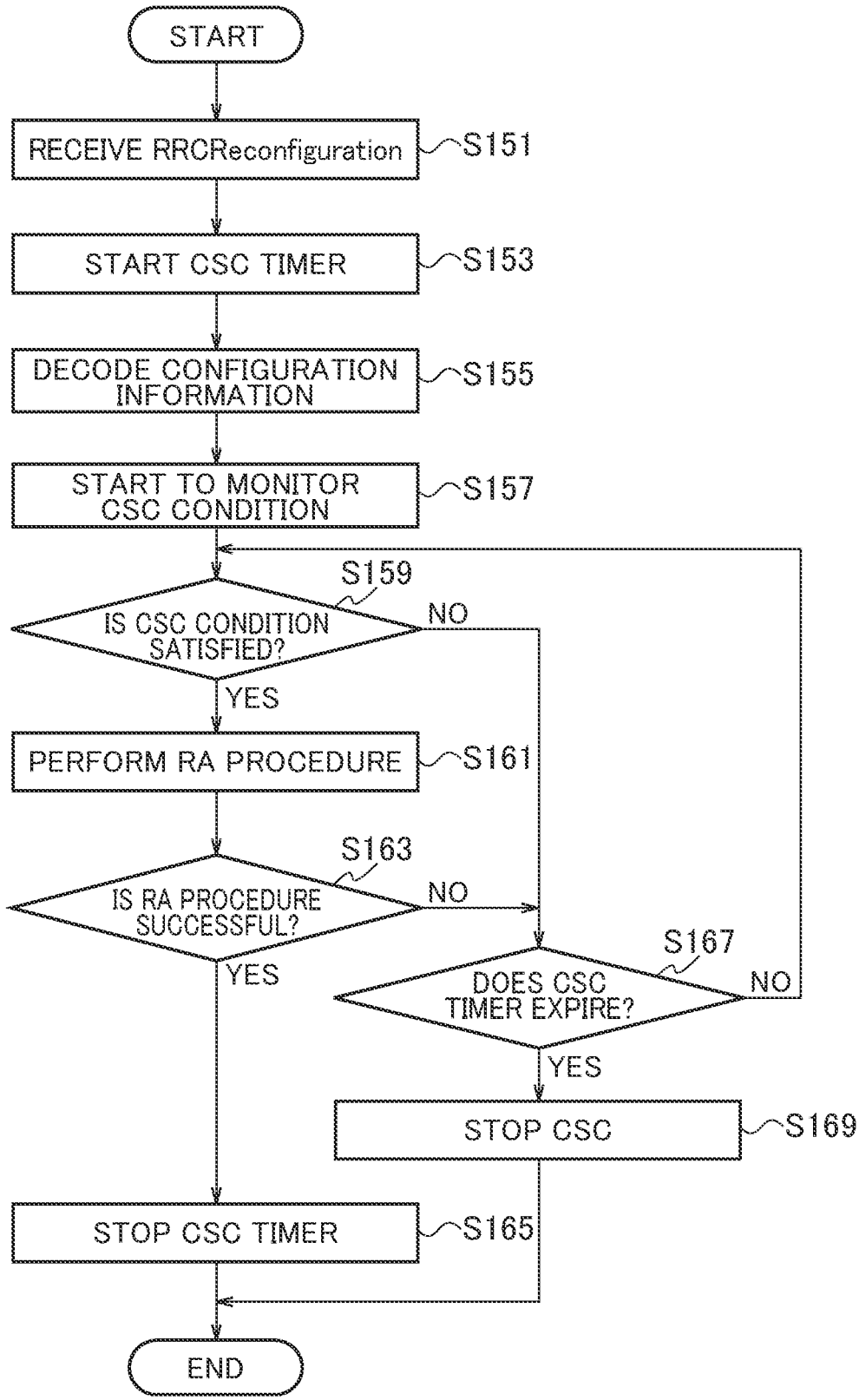
FIG. 8 is a diagram illustrating an operation flow of the terminal 200 in the Conditional SCG Change procedure.

FIG. 8 is a diagram illustrating an operation flow of the terminal 200 in the Conditional SCG Change procedure. As illustrated in FIG. 8, the terminal 200 receives RRC Reconfiguration from the gNB 110A (S151). When the terminal 200 receives RRC Reconfiguration from the gNB 110A, the terminal 200 starts the CSC timer (S153).

When the terminal 200 starts the CSC timer, the terminal 200 decodes the configuration information of each candidate cell in RRC Reconfiguration to obtain the configuration information (S155). When the terminal 200 obtains the configuration information of each candidate cell, the terminal 200 starts to monitor the transition condition (CSC condition) to each candidate cell based on the configuration information of each candidate cell (S157). Specifically, the terminal 200 starts to judge whether or not the transition condition to each candidate cell included in the configuration information of each candidate cell is satisfied.

The terminal 200 judges whether or not the transition condition to each candidate cell is satisfied (S159). If the terminal 200 judges that the transition condition to one candidate cell is satisfied, the terminal 200 performs the RA procedure between the gNB 110C and the terminal 200 (S161).

For example, the terminal 200 performs a measurement of each candidate cell. If Event A3 or Event A5 is fulfilled in one candidate cell, the terminal 200 judges that the transition condition to the one candidate cell is satisfied.

The terminal 200 judges whether or not the RA procedure is successful (S163). If the terminal 200 judges that the RA procedure is successful, the terminal 200 establishes synchronization between the gNB 110C and the terminal 200 and then stops the CSC timer (S165). When the terminal 200 stops the CSC timer, the terminal 200 transmits RRC Reconfiguration Complete to the gNB 110C, for example.

If the terminal 200 judges that the transition condition to each candidate cell is not satisfied in S159 or the RA procedure is not successful in S163, the terminal 200 judges whether or not the CSC timer expires (S167). If the terminal 200 judges that the CSC timer expires, the terminal 200 detects that a transition to a candidate cell fails and then stops the Conditional SCG Change procedure (S169). When the terminal 200 stops the Conditional SCG Change procedure, the terminal 200 reselects a cell other than the candidate cell, for example.

On the other hand, if the terminal 200 judges that the CSC timer does not expire, the terminal 200 returns to S159 and then judges whether or not the transition condition to each candidate cell is satisfied (5.2.2) Operation Example 2

In Operation Example 1, the terminal 200 starts the CSC timer upon reception of RRC Reconfiguration from the gNB 110A. In the present operation example, the terminal 200 starts the CSC timer upon success of decoding of configuration information of a candidate cell in RRC Reconfiguration.

Specifically, when the terminal 200 receives RRC Reconfiguration from the gNB 110A, the terminal 200 decodes configuration information of a candidate cell in RRC Reconfiguration. If the terminal 200 succeeds in decoding of the configuration information of the candidate cell in RRC Reconfiguration, the terminal 200 starts the CSC timer.

(5.2.3) Operation Example 3

In Operation Example 1, the terminal 200 starts the CSC timer upon reception of RRC Reconfiguration from the gNB 110A. In the present operation example, the terminal 200 starts the CSC timer upon starting to monitor a CSC condition based on configuration information of a candidate cell.

Specifically, when the terminal 200 receives RRC Reconfiguration from the gNB 110A, the terminal 200 decodes configuration information of a candidate cell in RRC Reconfiguration.

If the terminal 200 succeeds in decoding of the configuration information of the candidate cell in RRC Reconfiguration to obtain the configuration information of the candidate cell, the terminal 200 starts to monitor a CSC condition based on the configuration information. The terminal 200 starts the CSC timer when starting to monitor the CSC condition.

(5.2.4) Operation Example 4

In Operation Example 1, the terminal 200 starts the CSC timer upon reception of RRC Reconfiguration from the gNB 110A. In the present operation example, the terminal 200 starts the CSC timer upon judging that a transition condition to a candidate cell is satisfied.

Specifically, when the terminal 200 receives RRC Reconfiguration from the gNB 110A, the terminal 200 decodes configuration information of a candidate cell in RRC Reconfiguration.

If the terminal 200 succeeds in decoding of the configuration information of the candidate cell in RRC Reconfiguration to obtain the configuration information of the candidate cell, the terminal 200 starts to monitor a CSC condition based on the configuration information. The terminal 200 starts the CSC timer when judging that the transition condition to the candidate cell is satisfied.

(6) Other Embodiments

Although the contents of the present invention have been described along with the embodiment, the present invention is not limited to these descriptions, and it will be obvious to those skilled in the art that various modifications and improvements can be made thereto.

For example, in the embodiments described above, NR has been described as an example. However, the Conditional HO and the Conditional SCG Connection are also applicable to LTE, and the same operation may be performed in LTE.

The block configuration diagram (FIG. 2) used for explaining the above-described embodiment illustrates blocks of functional unit. Those functional blocks (structural components) are realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting is called a transmitting unit or a transmitter. For any of the above, as explained above, the realization method is not particularly limited to any one method.

Figure 9:
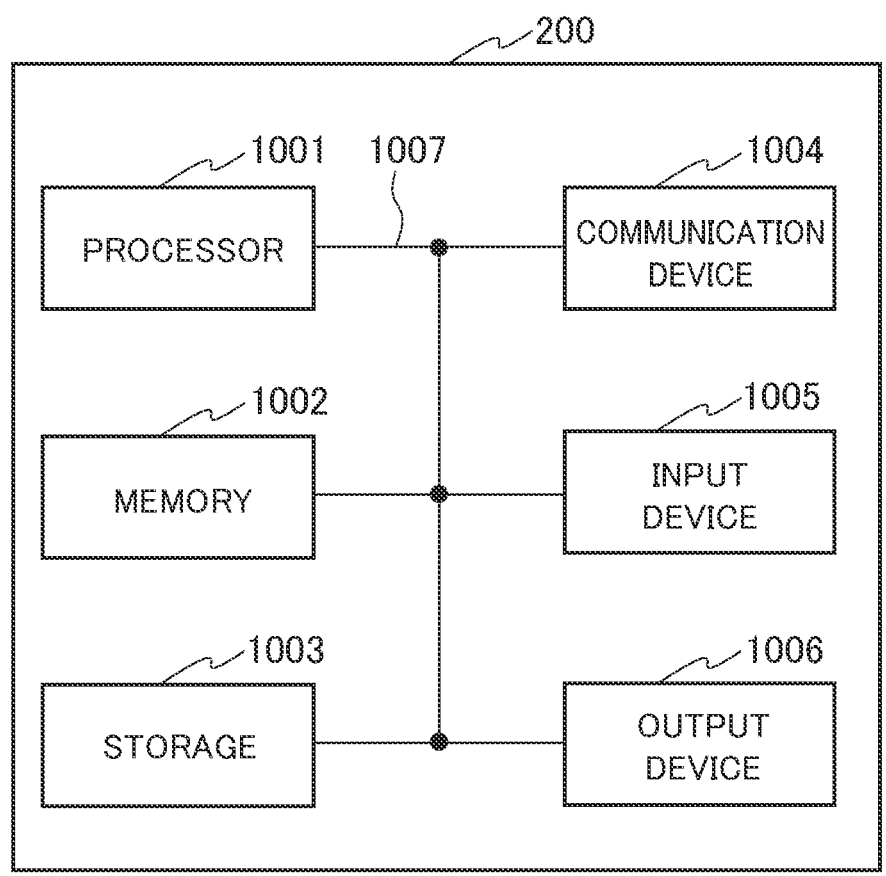
FIG. 9 is a diagram illustrating an example of a hardware configuration of the terminal 200.

Furthermore, the terminal 200 explained above may function as a computer that performs the processing of the radio communication method of the present disclosure. FIG. 9 is a diagram illustrating an example of a hardware configuration of the terminal. As illustrated in FIG. 9, the terminal can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. A hardware configuration of the device may be constituted by including one or plurality of the devices illustrated in the figure, or may be constituted by without including a part of the devices.

The functional blocks of the device can be realized by any of hardware elements of the computer device or a desired combination of the hardware elements.

Moreover, the processor 1001 performs operation by loading a predetermined software (program) on hardware such as the processor 1001 and the memory 1002, and realizes various functions of the device by controlling communication via the communication device 1004, and controlling at least one of reading and writing of data on the memory 1002 and the storage 1003.

The processor 1001, for example, operates an operating system to control the entire computer. The processor 1001 can be configured with a central processing unit (CPU) including an interface with a peripheral device, a control device, an operation device, a register, and the like.

Moreover, the processor 1001 reads a program (program code), a software module, data, and the like from at least one of the storage 1003 and the communication device 1004 into the memory 1002, and executes various processing according to them. As the program, a program that is capable of executing on the computer at least a part of the operation explained in the above embodiments, is used. Alternatively, various processes explained above may be executed by one processor 1001 or may be executed simultaneously or sequentially by two or more processors 1001. The processor 1001 can be implemented by using one or more chips. Alternatively, the program can be transmitted from a network via a telecommunication line.

The memory 1002 is a computer readable recording medium and may configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main storage device), and the like. The memory 1002 can store therein a program (program codes), software modules, and the like that can execute the method according to the embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including at least one of the memory 1002 and the storage 1003, a server, or other appropriate medium.

The communication device 1004 is hardware (transmission and reception device) capable of performing communication between computers via at least one of a wired network and a wireless network. The communication device 1004 is also called, for example, a network device, a network controller, a network card, a communication module, and the like.

The communication device 1004 may include a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information therebetween. The bus 1007 may be constituted by a single bus or may be constituted by separate buses between the devices.

Further, the device may be configured to include hardware such as a microprocessor, a Digital Signal Processor (DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB), System Information Block (SIB)), other signals, or a combination of these. The RRC signaling may be called RRC message, for example, or may be RRC Connection Setup message, RRC Connection Reconfiguration message, or the like.

Each of the above aspects/embodiments may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input and output information can be stored in a specific location (for example, a memory) or may be managed in a management table. The information to be input and output can be overwritten, updated, or added. The information can be deleted after outputting. The inputted information may be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, optical fiber cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

Note that the terms described in the present disclosure and terms necessary for understanding the present disclosure may be replaced by terms having the same or similar meanings. For example, at least one of a channel and a symbol may be a signal (signaling). Also, a signal may be a message.

Further, a component carrier (CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, may be expressed as a relative value from a predetermined value, or may be represented by corresponding other information. For example, the radio resource may be instructed by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of at least one of a base station and a base station subsystem that perform the communication service in this coverage.

In the present disclosure, the terms "mobile station (MS)", "user terminal", "user equipment (UE)", "terminal" and the like can be used interchangeably.

The mobile station may be called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like.

The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same applies). For example, each of the aspects/embodiments of the present disclosure may be applied to a configuration that allows communication between a base station and a mobile station to be replaced with communication between a plurality of mobile stations (which may be referred to as, for example, Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms such as an uplink channel, a downlink channel, or the like may be read as a side channel.

Likewise, a mobile station in the present disclosure may be read as a base station. In this case, the base station may have the function of the mobile station.

A radio frame may be configured by one or more frames in the time domain. One frame or each of a plurality frames in the time domain may be called a subframe.

Further, the subframe may be configured by one or more slots in the time domain. The subframe may have a fixed time length (for example, 1 ms) that does not depend on numerology.

The numerology may be a communication parameter applied to at least one of transmission and reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, specific windowing processing performed by the transceiver in the time domain, and the like.

The slot may be configured by one or more symbols (Orthogonal Frequency Division Multiplexing (OFDM)) symbols, Single Carrier Frequency Division Multiple Access (SC-FDMA) symbols, and the like) in the time domain. The slot may be a time unit based on the numerology.

The slot may include a plurality of minislots. Each minislot may be configured by one or more symbols in the time domain. The minislot may also be called a subslot. The minislot may be configured by fewer symbols than slots. PDSCH (or PUSCH) transmitted in a time unit larger than the minislot may be called a PDSCH (or PUSCH) mapping type A. PDSCH (or PUSCH) transmitted using the minislot may be called a PDSCH (or PUSCH) mapping type B.

Each of the radio frame, the subframe, the slot, the minislot, and the symbol represents a time unit for transmitting a signal. Different names may be used for the radio frame, the subframe, the slot, the minislot, and the symbol, respectively.

For example, one subframe may be called a transmission time interval (TTI), a plurality of consecutive subframes may be called TTI, and one slot or one minislot may be called TTI. That is, at least one of the subframe and TTI may be a subframe (1 ms) in existing LTE, a period shorter than 1 ms (for example, 1-13 symbols), or a period longer than 1 ms. Note that a unit representing TTI may be called a slot, a minislot, or the like instead of the subframe.

Here, TTI refers to a minimum time unit of scheduling in radio communication, for example. For example, in the LTE system, the base station performs scheduling to allocate radio resources (frequency bandwidth, transmission power, and the like that can be used in each user terminal) to each user terminal in units of TTI. Note that a definition of TTI is not limited thereto.

TTI may be a transmission time unit such as a channel-encoded data packet (transport block), a code block, or a code word, or may be a processing unit of scheduling, link adaptation, or the like. Note that when TTI is given, a time interval (for example, the number of symbols) in which a transport block, a code block, a code word, and the like are actually mapped may be shorter than TTI.

Note that when one slot or one minislot is called TTI, one or more TTIs (that is, one or more slots or one or more minislots) may be a minimum time unit of the scheduling.

Further, the number of slots (the number of minislots) configuring the minimum time unit of the scheduling may be controlled.

TTI having a time length of 1 ms may be called normal TTI (TTI in LTE Rel. 8-12), normal TTI, long TTI, a normal subframe, a normal subframe, a long subframe, a slot, or the like. TTI shorter than normal TTI may be called shortened TTI, short TTI, partial TTI (partial or fractional TTI), a shortened subframe, a short subframe, a minislot, a subslot, a slot, or the like.

Note that long TTI (for example, normal TTI, subframe, or the like) may be read as TTI having a time length exceeding 1 ms, and short TTI (for example, shortened TTI or the like) may be read as TTI having a TTI length less than the TTI length of long TTI and equal to or more than 1 ms.

The resource block (RB) is a resource allocation unit in the time domain and the frequency domain, and may include one or more continuous subcarriers in the frequency domain.

The number of subcarriers included in RB may be the same regardless of numerology, for example, twelve. The number of subcarriers included in RB may be determined on the basis of numerology.

Further, the time domain of RB may include one or more symbols, and may have a length of one slot, one minislot, one subframe, or 1 TTI. 1 TTI, one subframe, or the like may be configured by one or more resource blocks.

Note that one or more RBs may be called a physical resource block (Physical RB: PRB), a subcarrier group (SubCarrier Group: SCG), a resource element group (Resource Element Group: REG), a PRB pair, an RB pair, or the like.

Further, the resource block may be configured by one or more resource elements (RE). For example, 1RE may be a radio resource region of one subcarrier and one symbol.

A bandwidth part (BWP) (may be called a partial bandwidth or the like) may represent a subset of consecutive common resource blocks (RBs) for certain numerology in a certain carrier. Here, the common RB may be specified by an index of RB based on a common reference point of the carriers. PRB may be defined by certain BWP, and may be numbered within BWP.

BWP may include BWP for UL (UL BWP) and BWP for DL (DL BWP). For UE, one or more BWPs may be set in one carrier.

At least one of set BWPs may be active, and UE may not assume that a predetermined signal/channel is transmitted and received outside active BWP. Note that the "cell", the "carrier", and the like in the present disclosure may be read as "BWP".

The above-described structures such as the radio frame, the subframe, the slot, the minislot, and the symbol are merely examples. For example, the structures such as the number of subframes included in the radio frame, the number of slots per subframe or radio frame, the number of minislots included in the slot, the number of symbols and RBs included in the slot or minislot, the number of subcarriers included in RB, the number of symbols in TTI, the symbol length, the cyclic prefix (CP) length, and the like can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least one of one or more wires, cables, and printed electrical connections, and as some non-limiting and non-exhaustive examples, by using electromagnetic energy having wavelengths in the radio frequency domain, the microwave region, and light (both visible and invisible) region, and the like.

The reference signal may be abbreviated as RS and may be called pilot according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in the present disclosure, these articles may include a plurality of nouns following these articles.

The terms "determining" and "determining" used in the present disclosure may include a wide variety of operations. In "determining" and "deciding", for example, judging, calculating, computing, processing, deriving, investigating, looking up (search or inquiry) (for example, searching in a table, database, or other data structure), and ascertaining may be considered as "determining" and "deciding". Further, in "determining" and "deciding", receiving (for example, receiving information), transmitting (for example, transmitting information), input, output, and accessing (for example, accessing data in a memory) may be considered as "determining" and "deciding". Further, in "determining" and "deciding", "resolving", "selecting", "choosing", "establishing", and "comparing" may be considered as "determining" and "deciding". In other words, in "determining" and "deciding", any operation may be considered as "determining" and "deciding". Further, "determining (deciding)" may be read as "assuming", "expecting", "considering", and the like.

In the present disclosure, the term "A and B are different" may mean "A and B are different from each other". Note that the term may mean "A and B are each different from C".

Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS 10, 10a radio communication system
100A, 100B, 100C, 110A, 110B, 110C, 110D gNB
200 terminal
210 transmitting unit
220 receiving unit
230 holding unit
240 CHO timer
250 control unit
1001 processor
1002 memory
1003 storage
1004 communication device
1005 input device
1006 output device
1007 bus

The invention claimed is:

1. A terminal comprising:
a receiver that receives, from a transition source cell, information on a plurality of candidate cells and transition conditions for the plurality of candidate cells; and
a processor that performs, when a transition condition for one candidate cell of the plurality of candidate cells is satisfied, a synchronization with the one candidate cell and performs a transition to the one candidate cell as a transition destination cell, without receiving a transition command,
wherein the transition condition for the one candidate cell includes a first condition or a second condition,
when radio quality of the one candidate cell is larger than a value obtained by adding an offset to radio quality of the transition source cell, the processor judges that the first condition is fulfilled,
when the radio quality of the transition source cell becomes worse than a first threshold and the radio quality of the one candidate cell becomes better than a second threshold, the processor judges that the second condition is fulfilled, and
at a timing when the first condition or the second condition is fulfilled, the processor starts a timer and can perform the transition before the timer expires, and
the processor reselects a cell other than the plurality of candidate cells when the timer expires.

2. A radio communication system comprising:
a terminal that includes:
a receiver that receives, from a transition source cell, information on a plurality of candidate cells and transition conditions for the plurality of candidate cells; and
a processor that performs, when a transition condition for one candidate cell of the candidate cells is satisfied, a synchronization with the one candidate cell and performs a transition to the one candidate cell as a transition destination cell, without receiving a transition command,
wherein the transition condition for the one candidate cell includes a first condition or a second condition,
when radio quality of the one candidate cell is larger than a value obtained by adding an offset to radio quality of the transition source cell, the processor judges that the first condition is fulfilled,
when the radio quality of the transition source cell becomes worse than a first threshold and the radio quality of the one candidate cell becomes better than a second threshold, the processor judges that the second condition is fulfilled, and
at a timing when the first condition or the second condition is fulfilled, the processor starts a timer and can perform the transition before the timer expires, and
the processor reselects a cell other than the plurality of candidate cells when the timer expires.

3. A radio communication method applied to a terminal, comprising:
receiving from a transition source cell, by the terminal, information on a plurality of candidate cells and transition conditions for the plurality of candidate cells,
a transition condition for one candidate cell of the plurality of candidates including a first condition or a second condition;
judging, by the terminal, that the first condition is fulfilled when radio quality of the one candidate cell is larger than a value obtained by adding an offset to radio quality of the transition source cell, in a case where the transition condition includes the first condition;
judging, by the terminal, that the second condition is fulfilled when the radio quality of the transition source cell becomes worse than a first threshold and the radio quality of the one candidate cell becomes better than a second threshold, in a case where the transition condition includes the second condition;
starting, by the terminal, a timer at a timing when the first condition or the second condition is fulfilled;
performing, by the terminal, a synchronization with the one candidate cell and performing, by the terminal, a transition to the one candidate cell as a transition destination cell, without receiving a transition command, before the timer expires; and
reselecting, by the terminal, a cell other than the plurality of candidate cells when the timer expires.

* * * * *